United States Patent
Fornof et al.

(10) Patent No.: US 6,514,051 B2
(45) Date of Patent: Feb. 4, 2003

(54) OIL FILTER USED IN COMBINATION WITH A HEAT GENERATING ELEMENT

(75) Inventors: William P. Fornof, Girard, PA (US); James P. Koenig, Olmsted Township, Cuyahoga County, OH (US)

(73) Assignee: Bendix Commercial Vehicle Systems, LLC., Elyria, OH (US)

( * ) Notice: Subject to any disclaimer, the term of this patent is extended or adjusted under 35 U.S.C. 154(b) by 0 days.

(21) Appl. No.: 09/810,280

(22) Filed: Mar. 16, 2001

(65) Prior Publication Data

US 2002/0131874 A1 Sep. 19, 2002

(51) Int. Cl.[7] ............................ F04B 39/00; B01D 19/00
(52) U.S. Cl. ................................. 417/313; 96/189
(58) Field of Search ........................ 417/313; 96/189, 96/190

(56) References Cited

U.S. PATENT DOCUMENTS

| | | | |
|---|---|---|---|
| 3,572,008 A | 3/1971 | Hankison | 55/33 |
| 3,784,220 A * | 1/1974 | Wanner | 267/64.17 |
| 3,796,025 A * | 3/1974 | Kasten | 55/302 |
| 4,311,439 A | 1/1982 | Stofen | 417/313 |
| 4,468,239 A | 8/1984 | Frantz | 55/162 |
| 4,519,819 A | 5/1985 | Frantz | 55/162 |
| 4,544,385 A * | 10/1985 | Tanaka | 137/341 |
| 4,707,166 A * | 11/1987 | Khosropour | 55/315 |
| 4,738,454 A * | 4/1988 | Watanabe | 280/124.16 |
| 4,883,023 A | 11/1989 | Tsang et al. | 123/25 A |
| 4,892,569 A | 1/1990 | Kojima | 55/163 |
| 5,002,593 A | 3/1991 | Ichishita et al. | 55/218 |
| 5,087,178 A | 2/1992 | Wells | 418/1 |
| 5,261,946 A * | 11/1993 | Overby | 55/282.2 |
| 5,595,588 A * | 1/1997 | Blevins | 55/DIG. 17 |
| 5,600,953 A * | 2/1997 | Oshita et al. | 60/453 |

FOREIGN PATENT DOCUMENTS

| | | |
|---|---|---|
| EP | 0 585 174 A1 | 4/1994 |
| EP | 1 048 540 A1 | 11/2000 |
| WO | WO 90 12244 | 10/1990 |

* cited by examiner

Primary Examiner—Charles G. Freay
Assistant Examiner—Timothy P. Solak

(57) ABSTRACT

A compressed air system for an air brake system includes a heat generating element operating at an elevated temperature to maintain water in vapor state. The heat generating element is preferably an air brake compressor. A discharge oil filter is disposed downstream from the compressor for filtering oil from a stream of compressed air. The discharge oil filter is positioned close enough to the compressor to maintain water in the compressed air stream in a vapor form. The oil filter preferably includes an oil filtering media formulated to agglomerate oil as the stream of compressed air is filtered. The agglomerated oil and compressed air are passed downstream where the agglomerated oil and water from the air stream are removed. Alternatively, the agglomerated oil is filtered to a sump in a housing of the discharge oil filter.

28 Claims, 1 Drawing Sheet

OIL FILTER USED IN COMBINATION WITH A HEAT GENERATING ELEMENT

BACKGROUND OF THE INVENTION

1. Field of the Invention

The present invention relates to compressed air systems used in heavy vehicle braking systems. More particularly, this invention is directed to an air brake compressor system having a discharge oil filter disposed adjacent a heat generating element.

2. Discussion of the Art

Compressed air systems are used in brake systems to provide and maintain air under pressure to operate vehicle brakes and any auxiliary air systems. Conventional compressed air systems include an air compressor for generating pressurized air and a drying device disposed downstream from the air compressor for drying the air. A typical dryer includes a desiccant material enclosed within a housing which removes water from the compressed air.

Most air brake compressors are supplied with oil from the vehicle engine in order to lubricate the bearings and other components of the compressor. However, because oil is difficult to contain, it passes into the pressurized air stream exiting the compressor. Conventional air brake systems are designed such that the compressed air exiting from the air compressor is directly introduced into the air dryer. By doing so, the desiccant housed within the air dryer often becomes contaminated with the oil accompanying the air delivered from the compressor.

In order to minimize contamination of the air dryer desiccant, attempts have been made to place a filtering element at or adjacent the inlet area of the air dryer. The filtering element or oil filter would effectively remove oil from the compressed air before reaching the desiccant material. However, when the compressed air reaches the air dryer, much of the water vapor and oil will have condensed to form emulsions having a consistency similar to mayonnaise. The condensed oil and water emulsions are high in viscosity, difficult to filter, and require frequent filter changes.

In addition, the filter must be equipped with a drain passage or system to dispose of the filtered material. A relatively large draining capacity is required since a considerable amount of the water vapor condenses to liquid water upon reaching the air dryer. This, unfortunately adds to the complexity and cost of the compressed air system. Furthermore, water resulting from the condensed vapor has the potential to freeze. In order to prevent both freezing and the water vapor from condensing to form emulsions, heaters have been incorporated into filter devices to maintain the water in liquid form. However, the addition of a heating element adds to the complexity and cost of the compressed air system.

Accordingly, a continued need exists in the art to effectively eliminate desiccant contamination in an air dryer assembly of a brake system without having to use a complex drainage system or a separate heating element.

SUMMARY OF THE INVENTION

The present invention provides a compressed air system for pneumatic brake systems that meets the above needs and others in a simple and economical manner.

More particularly, the invention provides a compressed air system for an air brake system having a heat generating element operating at an elevated temperature to maintain water in a vapor form. A discharge oil filter is disposed downstream from the heat generating element for filtering oil from a stream of compressed air. The discharge oil filter is positioned sufficiently close to the heat generating element to maintain water in the compressed air stream in a vapor state while passing through the discharge oil filter. An air dryer disposed downstream from the discharge oil filter removes water from the stream of compressed air after the water vapor has condensed.

In a preferred embodiment, the heat generating element is an air brake compressor.

According to another proposed embodiment, a compressed air system for an air brake system includes a separate heat generating element operating at an elevated temperature to maintain water in a vapor state. Again, a discharge oil filter disposed downstream from the heat generating element removes oil from the compressed air. The discharge oil filter has an oil removal media formulated to agglomerate oil accompanying the stream of compressed air. The agglomerated oil is entrained in the compressed air and removed downstream from the discharge oil filter. A downstream air dryer subsequently removes water from the compressed air stream.

Preferably, the discharge oil filter is positioned adjacent the heat generating element to maintain water in a vapor state while the compressed air is filtered by the discharge oil filter.

A method of filtering oil from a stream of compressed air generated from an air brake system includes positioning a discharge oil filter between a heat generating element and an air dryer. The discharge oil filter is positioned sufficiently close to the heat generating element to assure that entrained water in the compressed air is maintained in a vapor state during filtration.

The method of filtering oil from a stream of compressed air preferably includes agglomerating the oil in the discharge oil filter and removing the agglomerated oil downstream from the filter.

A primary benefit of the subject invention resides in minimizing oil contamination of a desiccant material located in an air dryer of a compressed air system.

Another benefit of the subject invention resides in the ability to effectively filter oil from a compressed air stream without having to use a complex drainage system or a separate heating element.

Still another benefit of the subject invention is the provision of an oil filter, the placement of which maintains water in a vapor form so that oil can be more easily filtered from the compressed air stream.

Still other features and benefits of the invention will become apparent to those skilled in the art upon reading and understanding the following detailed description.

DETAILED DESCRIPTION OF THE PREFERRED EMBODIMENTS

Figure 1:
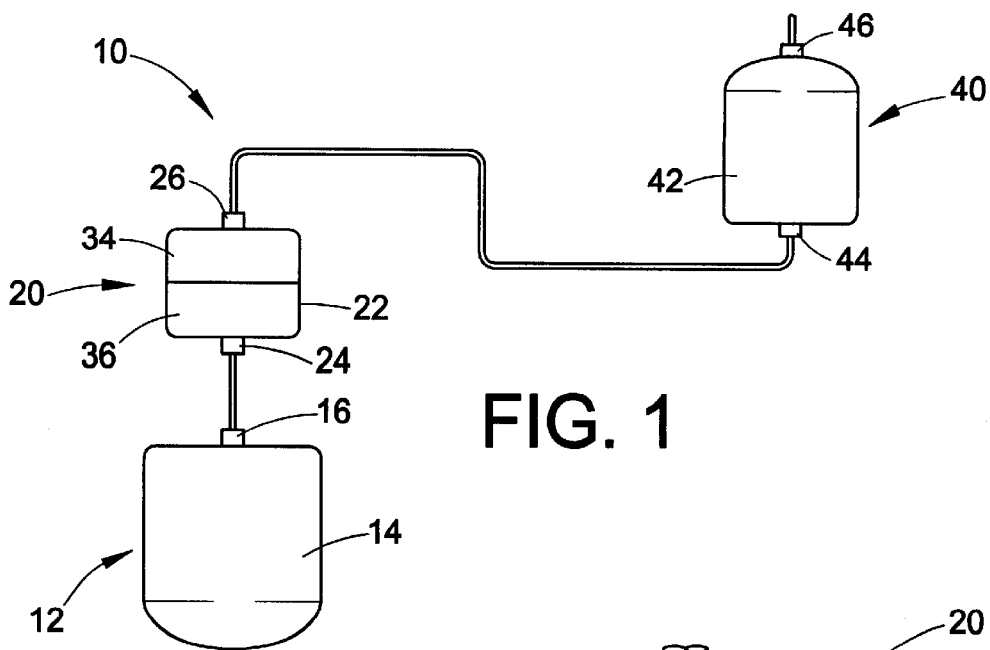
FIG. 1 is a schematic view of a compressed air system for a vehicle brake system in accordance with the present invention.

In FIG. 1, a compressed air system 10 for an air brake assembly is shown in accordance with the present invention.

The compressed air system includes a compressor 12 having a crank case 14 which houses portions of the compressor. The compressor generates compressed air in a conventional manner, for example, by using a piston (not shown) slidable within a bore (not shown) of the crank case. Dynamic components of the compressor, such as a crank shaft and wrist pin bearings, are lubricated with oil delivered from a vehicle engine (not shown). Oil migrates into the pressurized air stream which exits through an air supply port 16 of the compressor.

Figure 2:
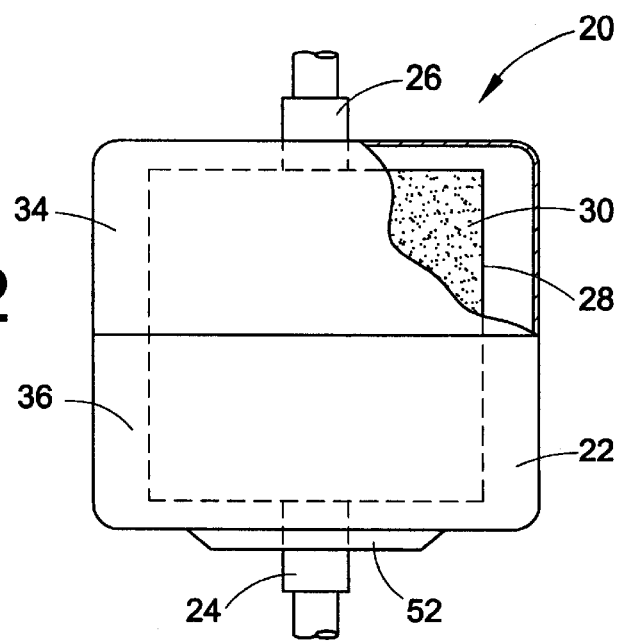
FIG. 2 is an elevational view of a discharge oil filter shown in partial cross-section.

With reference also to FIG. 2, a discharge oil filter 20 is disposed adjacent the air supply port of the compressor for filtering the oil from the compressed air stream. The discharge oil filter includes a housing 22 having an inlet 24 for receiving the compressed air and an outlet 26 where filtered air exits. Housing 22 encloses a filter element 28 having an oil removal media 30 which removes oil from the compressed air. In a preferred embodiment, the oil removal media consists of wrapped or pressed media specifically formulated to agglomerate oil.

The filter housing preferably includes a first upper portion 34 removably connected to a second lower portion 36. Such a configuration facilitates changing of the filter element.

The discharge oil filter 20 is strategically positioned so that oil may be effectively filtered without the use of complex drainage systems or heating elements. More specifically, air brake compressors and other heat generating elements of a vehicle operate at temperatures sufficiently elevated to maintain water in a vapor state. The discharge oil filter of the present invention is located adjacent one of these heat generating elements, such as the compressor shown in FIGS. 1 and 2, so that water in the air stream is maintained in a vapor state. In other words in accordance with the present invention, the oil filter advantageously uses the heat generated by the compressor, or any other suitable heat generating element, to prevent the water vapor from condensing.

As shown in FIG. 1, the heat generating element is preferably a compressor. However, any heat producing element can be alternatively used such as an engine block. In a preferred embodiment, the oil filter is located adjacent the compressor so that the temperature of the air stream through the oil filter does not fall below 180 F. Accordingly, the oil filter is able to exclusively filter oil, rather than filtering both oil and water or oil/water emulsions.

By exclusively filtering oil, the need for complex water drainage systems is eliminated. In addition, the need for a separate heating element is also eliminated by advantageously using the heat supplied from the compressor. Moreover, maintaining the air stream at an elevated temperature during oil filtration prevents water from freezing and, thus, the attendant problems associated therewith.

Figure 3:
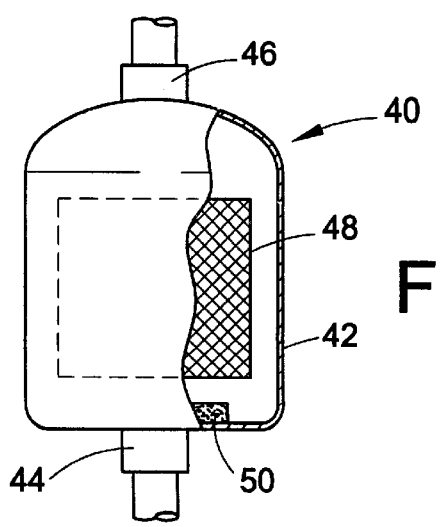
FIG. 3 is an elevational view of an air dryer shown in partial cross-section.

With reference also to FIG. 3, the compressed air system further includes an air dryer 40 located downstream from the discharge oil filter. The air dryer has a housing 42 with an inlet 44 where compressed air enters and an outlet 46 where compressed air exits. A drying agent or desiccant material 48 is enclosed by the housing and operates to remove water from the compressed air in a conventional, well-known manner. Optionally, the air dryer includes a filter 50 located near its inlet for removing any remaining oil or other foreign matter that might still accompany the compressed air stream.

In operation, the compressor 12 generates compressed air which exits at supply port 16. Upon exiting the supply port, the compressed air enters the discharge oil filter where oil is removed from the compressed air. When the oil enters the oil filter, it is substantially segregated, i.e., in the form of aerosols which have a diameter on the order of 0.3 to 5.0 microns. These aerosols are filtered by the removal media and agglomerated into larger particles or oil droplets on the order of 0.158 centimeters (1/16th inch). The agglomerated oil droplets are preferably entrained in the compressed air and passed downstream to the air dryer. At the air dryer, the agglomerated oil droplets are easily removed at filter 50 and subsequently drained from the system. Accordingly, no additional drain is required at the discharge oil filter. Alternatively, the oil droplets are removed at a sump 52 (see FIG. 2) of the oil filter housing. Moreover, it is also possible to drain the oil into the sump of the compressor or engine.

Once the compressed air has exited the discharge oil filter, it passes downstream to the air dryer 40 where water is removed by the drying agent or desiccant material 48. Consequently, the compressed air exiting the air dryer and used to operate the vehicle brakes and any auxiliary air systems has moisture and oil effectively removed therefrom in accordance with the present invention.

The invention has been described with reference to the preferred embodiments. Obviously, modifications and alterations will occur to others upon a reading and understanding of the detailed description. For example, the oil discharge filter may be placed adjacent any system which generates heat. The invention is intended to include all such modifications and alterations insofar as they come within the scope of the accompanying claims and the equivalents thereof.

Having thus described the preferred embodiment, the invention is now claimed to be:

1. A compressed air system for an air brake system comprising:
    a heat generating element operating at a temperature high enough to maintain water in a vapor state,
    a discharge oil filter disposed downstream from the heat generating element for filtering oil from a stream of compressed air, the discharge oil filter being positioned adjacent the heat generating element to maintain water in the compressed air stream in a vapor form while the compressed air stream is being filtered by the discharge oil filter; and
    an air dryer disposed downstream from the discharge oil filter for removing water from the stream of compressed air.

2. The compressed air system of claim 1, wherein the heat generating element is an air brake compressor.

3. The compressed air system of claim 1, wherein the discharge oil filter includes a housing enclosing a filter element having an oil removal media.

4. The compressed air system of claim 3, wherein the oil removal media includes one of wrapped and pressed media formulated to agglomerate oil.

5. The compressed air system of claim 1, wherein the heat generating element maintains the compressed air through the oil filter at a temperature above 180 F.

6. The compressed air system of claim 1, wherein the discharge oil filter is configured to agglomerate oil and form oil droplets during filtration.

7. The compressed air system of claim 6, wherein the air dryer removes the agglomerated oil entrained by the compressed air stream.

8. The compressed air system of claim 6, further including:
    a sump in a housing of the discharge oil filter, the agglomerated oil being drained in the sump.

9. The compressed air system of claim 1, wherein the discharge oil filter receives oil in the form of aerosols.

10. A compressed air system for an air brake system comprising:

a heat generating element operating at a temperature high enough to maintain water in a vapor form, a discharge oil filter disposed downstream from the heat generating element for removing oil from a stream of compressed air including the water in the vapor form, the discharge oil filter having an oil removal media formulated to agglomerate oil accompanying the stream of compressed air, the agglomerated oil being entrained by the steam of compressed air and removed downstream from the discharge oil filter; and an air dryer disposed downstream from the discharge oil filter for removing the water from the stream of compressed air.

11. The compressed air system of claim 10, wherein the oil is removed at a filter disposed adjacent an inlet of the air dryer.

12. The compressed air system of claim 10, wherein the heat generating element maintains water in the compressed air stream in a vapor state.

13. The compressed air system of claim 10, wherein the discharge oil filter is positioned adjacent the heat generating element to maintain the compressed air through the oil filter at a temperature above 180 F.

14. The compressed air system of claim 10, wherein the heat generating element is an air brake compressor.

15. The compressed air system of claim 10, wherein the discharge oil filter receives oil in the form of aerosols.

16. A method for filtering oil from a stream of compressed air generated from a compressed air system of an air brake system comprising the steps of:

providing a discharge oil filter between a heat generating element and an air dryer; and positioning the discharge oil filter close enough to the heat generating element so that water in the stream of compressed air is maintained in a vapor state during filtration.

17. The method according to claim 16, further comprising the steps of:

agglomerating the oil in the discharge oil filter; and removing the agglomerated oil entrained by the stream of compressed air downstream from the discharge oil filter.

18. An oil filter used in combination with a heat generating element, the filter comprising:

a housing having an inlet and an outlet, compressed air entering the housing via the inlet and exiting the housing via the outlet; and means for removing oil from the compressed air within the housing, the housing being located downstream and adjacent the heat generating element for preventing water vapor in the compressed air from condensing in the housing.

19. The oil filter used in combination with a heat generating element as set forth in claim 18, wherein the means for removing oil from the compressed agglomerates oil.

20. The oil filter used in combination with a heat generating element as set forth in claim 18, wherein the means for removing oil includes one of wrapped media and pressed media.

21. The oil filter used in combination with a heat generating element as set forth in claim 18, wherein the heat generating element includes a compressor.

22. The oil filter used in combination with a heat generating element as set forth in claim 18, wherein the oil passing through the inlet is substantially segregated in the form of particles having diameters between about 0.3 microns and about 5.0 microns, the means for removing oil agglomerating the particles.

23. The oil filter used in combination with a heat generating element as set forth in claim 22, wherein the housing includes:

a sump for collecting the agglomerated particles.

24. A compressed air system for an air brake system comprising:

a heat generating element operating at a temperature high enough to maintain water in a vapor state, a discharge oil filter disposed downstream from the heat generating element for filtering oil from a stream of compressed air, the discharge oil filter being positioned relative to the heat generating element to maintain water in the compressed air stream in a vapor form while the compressed air stream is being filtered by the discharge oil filter; and an air dryer disposed downstream from the discharge oil filter for removing water from the stream of compressed air.

25. The compressed air system for an air brake system of claim 24, wherein the heat generating element is a compressor.

26. The compressed air system for an air brake system of claim 24, wherein the heat generating element maintains the compressed air through the oil filter at a temperature above about 180 F.

27. The compressed air system for an air brake system of claim 24, wherein the discharge oil filter is configured to agglomerate oil and form oil droplets during filtration.

28. The compressed air system for an air brake system of claim 27, wherein the air dryer removes the agglomerated oil entrained by the compressed air stream.

* * * * *